(12) United States Patent
Tirer et al.

(10) Patent No.: US 11,046,328 B2
(45) Date of Patent: Jun. 29, 2021

(54) VELOCITY ESTIMATION OF AN OBJECT

(71) Applicant: GM GLOBAL TECHNOLOGY OPERATIONS LLC, Detroit, MI (US)

(72) Inventors: Tom Tirer, Tel Aviv (IL); Oded Bialer, Petah Tivak (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 16/141,080

(22) Filed: Sep. 25, 2018

(65) Prior Publication Data
US 2020/0094846 A1 Mar. 26, 2020

(51) Int. Cl.
*B60W 40/105* (2012.01)
*G01S 17/58* (2006.01)
*G01S 13/58* (2006.01)

(52) U.S. Cl.
CPC ......... *B60W 40/105* (2013.01); *G01S 13/589* (2013.01); *G01S 17/58* (2013.01); *B60W 2520/10* (2013.01)

(58) Field of Classification Search
CPC ............. B60W 40/105; B60W 2520/10; G01S 13/589; G01S 17/58
See application file for complete search history.

(56) References Cited

U.S. PATENT DOCUMENTS

| 7,266,477 | B2 * | 9/2007 | Foessel | G01S 13/723 |
| | | | | 340/436 |
| 8,164,514 | B1 * | 4/2012 | Yang | G01S 5/0257 |
| | | | | 342/357.28 |
| 10,070,101 | B2 * | 9/2018 | Newman | G06T 7/77 |
| 2018/0341263 | A1 * | 11/2018 | Rust | G01S 13/74 |

* cited by examiner

*Primary Examiner* — Roy Y Yi
*Assistant Examiner* — Geoffrey T Evans
(74) *Attorney, Agent, or Firm* — Cantor Colburn LLP

(57) ABSTRACT

Systems, vehicles, and techniques are provided for the estimation of a linear velocity vector of an object. In some embodiments, a technique can include receiving first data indicative of first locations relative to an object at a first instant during movement of the object, and receiving second data indicative of second locations relative to the object at a second instant during the movement of the object. The technique also can include transforming the first data into third data corresponding to the second instant using at least one velocity vector hypothesis for a velocity of the object. The technique can further include solving an optimization problem with respect to a geometric volume of a convex hull of a union of the second data and the third data, and generating an estimate of a velocity of the object using a solution of the optimization problem.

15 Claims, 13 Drawing Sheets

VELOCITY ESTIMATION OF AN OBJECT

INTRODUCTION

The subject disclosure relates to velocity estimation of an object. A velocity of a rigid object can be determined from changes in the position of one or more reference points on or within the object over time. In some scenarios, such a determination can be difficult in practice. For instance, a high-resolution sensor system can be assembled in an object and can identify specific positions on the object. Those positions can be referred to as detection points. Each one of the detection points corresponds to signals detected by the high-resolution sensor system, where the signals are localized about an identified specific position on the object. While the localized nature of the detection points might make them attractive to serve as reference points in the estimation of the velocity of the object, the number of the detection points and their arrangement on the object can change over time. Hence, reliance on such detections points to estimate the velocity of the object can yield inaccurate results or might make such an estimation plainly unfeasible.

Accordingly, it is desirable to provide technologies for the estimation of a linear velocity vector of an object when rich position information is available for the object.

SUMMARY

In one exemplary embodiment, the disclosure provides a method. The method includes receiving first data indicative of first locations relative to an object at a first instant during movement of the object, and receiving second data indicative of second locations relative to the object at a second instant during the movement of the object. The method also includes transforming the first data into third data corresponding to the second instant using at least one velocity vector hypothesis for a velocity of the object. The method further includes solving an optimization problem with respect to a geometric volume of a convex hull of a union of the second data and the third data. The method also includes generating an estimate of a velocity of the object using a solution of the optimization problem.

In addition to one or more of the elements disclosed herein, the at least one velocity vector hypothesis includes multiple defined velocity vectors, and the third data includes first datasets defined at least by respective ones of the multiple defined velocity vectors. Therefore, the method also includes generating second datasets corresponding to respective unions of the second data and respective ones of the first datasets. The method further includes generating convex hulls for respective ones of the second datasets; determining geometric volumes for respective ones of the convex hulls, and determining a first convex hull of the convex hulls having a minimum geometric volume relative to respective geometric volumes of second convex hulls.

In addition to one or more elements disclosed herein, the generating the estimate of the velocity of the object includes configuring a first velocity vector associated with the first convex hull as an estimate of a linear velocity vector of the object.

In addition to one or more elements disclosed herein, the transforming includes propagating, for a time interval corresponding to a difference between the first defined instant and the second defined instant, a position vector along a linear trajectory based on a second velocity vector of the group of defined velocity vectors. The position vector represents a location of the first locations. The transforming also includes generating a record indicative of a second location corresponding to the propagated position vector. The transforming further includes adding the record to a dataset of the first datasets, the dataset is associated with the second velocity vector.

In addition to one or more elements disclosed herein, the transforming includes paring the first data by removing at least one outlier record indicative of a location external to the object.

In addition to one or more elements disclosed herein, the at least one velocity vector hypothesis for the velocity of the object comprises a current velocity vector hypothesis, and wherein the solving comprising determining a minimum geometric volume of the convex hull of the union of the second data and the third data by iteratively updating the current velocity vector hypothesis to progressively reduce a current geometric volume of a current convex hull until a convergence criterion is satisfied.

In addition to one or more elements disclosed herein, the object is a vehicle that includes a control system, the method further comprising implementing, by the control system, a process to control an operation of the vehicle using at least the estimate of the velocity of the object.

In another exemplary embodiment, the disclosure provides a system. The system includes at least one processor and at least one memory device coupled to the at least one processor. The at least one memory device has instructions encoded thereon that, in response to execution, cause the at least on processor to perform or facilitate operations including receiving first data indicative of first locations relative to an object at a first instant during movement of the object. The operations also include receiving second data indicative of second locations relative to the object at a second instant during the movement of the object. The operations also include transforming the first data into third data corresponding to the second instant using at least one velocity vector hypothesis for a velocity of the object. The operations further include solving an optimization problem with respect to a geometric volume of a convex hull of a union of the second data and the third data. The operations still further include generating an estimate of a velocity of the object using a solution of the optimization problem.

In addition to one or more elements disclosed herein, the at least one velocity vector hypothesis includes multiple defined velocity vectors, and the third data comprises first datasets defined at least by respective ones of the multiple defined velocity vectors. As such, the operations also include generating second datasets corresponding to respective unions of the second data and respective ones of the first datasets; generating convex hulls for respective ones of the second datasets; determining geometric volumes for respective ones of the convex hulls. In addition, the operations also include determining a first convex hull of the convex hulls having a minimum geometric volume relative to respective geometric volumes of second convex hulls.

In addition to one or more elements disclosed herein, the generating operation to estimate of the velocity of the object includes configuring a first velocity vector associated with the first convex hull as an estimate of a linear velocity vector of the object.

In addition to one or more elements disclosed herein, the transforming operation includes propagating, for a time interval corresponding to a difference between the first defined instant and the second defined instant, a position vector along a linear trajectory based on a second velocity vector of the group of defined velocity vectors, and wherein the position vector represents a location of the first locations.

The transforming operation also includes generating a record indicative of a second location corresponding to the propagated position vector. The transforming operation also includes adding the record to a dataset of the first datasets, the dataset is associated with the second velocity vector.

In addition to one or more elements disclosed herein, the transforming operation includes paring the first data by removing at least one outlier record indicative of a location external to the object.

In addition to one or more elements disclosed herein, the at least one velocity vector hypothesis for the velocity of the object includes a current velocity vector hypothesis, and the solving includes determining a minimum geometric volume of the convex hull of the union of the second data and the third data by iteratively updating the current velocity vector hypothesis to progressively reduce a current geometric volume of a current convex hull until a convergence criterion is satisfied.

In yet another exemplary embodiment, the disclosure provides a vehicle. The vehicle includes a sensor system that generates data representative of locations relative to the vehicle. The vehicle also includes a computing system functionally coupled to the sensor system, where the computing system includes at least one processor configured at least to receive first data indicative of first locations relative to an object at a first instant during movement of the object. The at least one processor is further configured at least to receive second data indicative of second locations relative to the object at a second instant during the movement of the object. The at least one processor is further configured at least to transform the first data into third data corresponding to the second instant using at least one velocity vector hypothesis for a velocity of the object. The at least one processor is further configured at least to solve an optimization problem with respect to a geometric volume of a convex hull of a union of the second data and the third data. The at least one processor is further configured at least to generate an estimate of a velocity of the vehicle using a solution of the optimization problem.

In addition to one or more elements disclosed herein, the at least one velocity vector hypothesis includes multiple defined velocity vectors, and the third data includes first datasets defined at least by respective ones of the multiple defined velocity vectors. The at least one processor further configured to generate second datasets corresponding to respective unions of the second data and respective ones of the first datasets. The at least one processor further configured to generate convex hulls for respective ones of the second datasets, and determine geometric volumes for respective ones of the convex hulls. In addition, the at least one processor further configured to determine a first convex hull of the convex hulls having a minimum geometric volume relative to respective geometric volumes of second convex hulls.

In addition to one or more elements disclosed herein, to generate the estimate of the velocity of the vehicle, the at least one processor is further configured to configure a first velocity vector associated with the first convex hull as an estimate of a linear velocity vector of the vehicle.

In addition to the elements disclosed herein, to transform the first data into third data, the at least one processor is further configured to propagate, for a time interval corresponding to a difference between the first defined instant and the second defined instant, a position vector along a linear trajectory based on a second velocity vector of the group of defined velocity vectors. The position vector represents a location of the first locations. The at least one processor further configured to generate a record indicative of a second location corresponding to the propagated position vector. The at least one processor further configured to add the record to a dataset of the first datasets, the dataset is associated with the second velocity vector.

In addition to the elements disclosed herein, to transform the first data into third data, the at least one processor is further configured to pare the first data by removing at least one outlier record indicative of a location external to the object.

In addition to the elements disclosed herein, the vehicle also includes a controller system configured to implement a process to control an operation of the vehicle using at least the estimate of the velocity.

In addition to the elements disclosed herein, the sensor system includes at least one second processor configured to generate a portion of the first data and a portion of the second data. The sensor system includes one or more of a radar system or a lidar system.

The above features and advantages, and other features and advantages of the disclosure are readily apparent from the following detailed description when taken in connection with the annexed drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
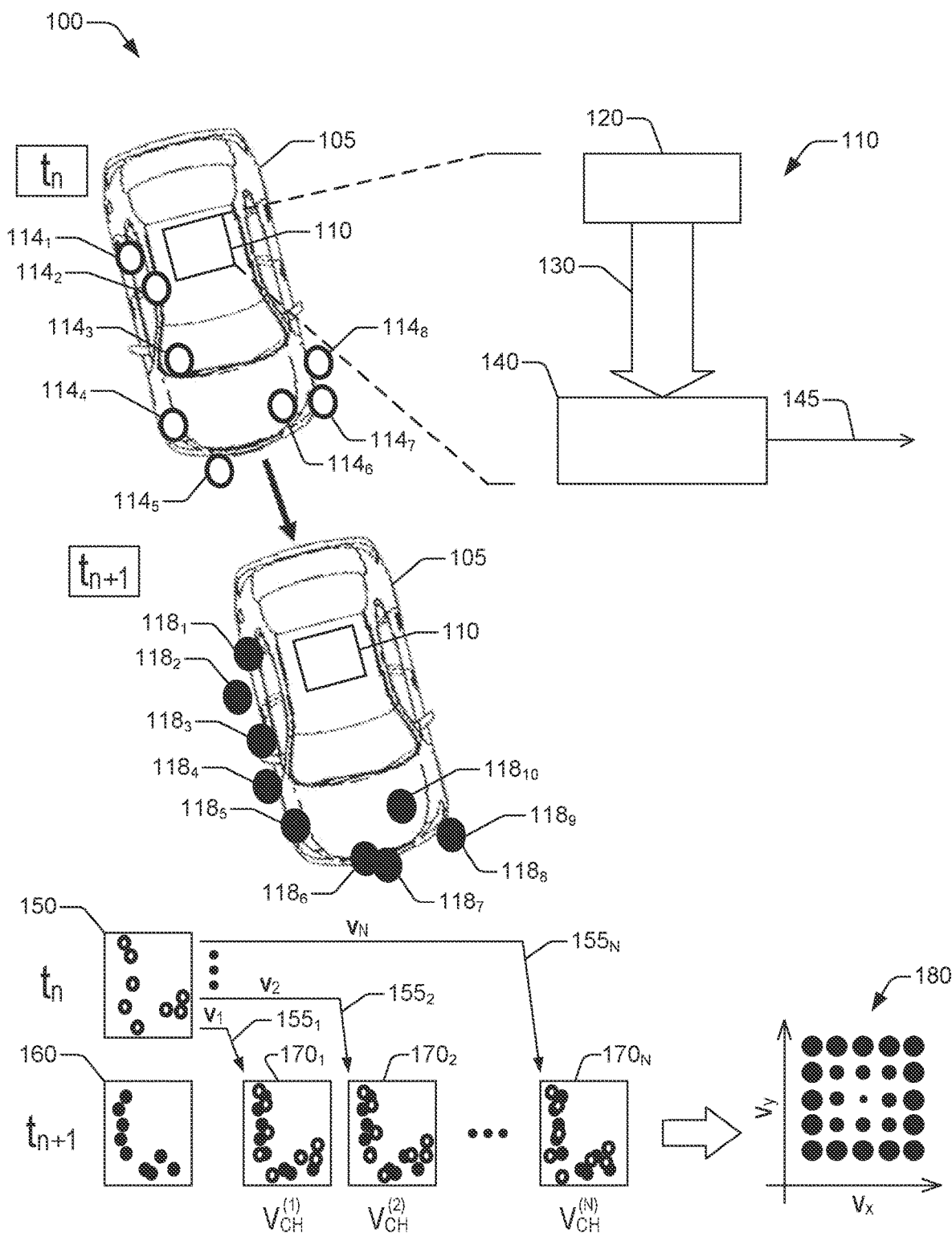
FIG. 1 presents an example of an operational environment for estimation of velocity of an automobile, in accordance with one or more embodiments of the disclosure.

The following description is merely exemplary in nature and is not intended to limit the present disclosure, its application or uses. It should be understood that throughout the drawings, corresponding reference numerals indicate like or corresponding parts and features.

The disclosure recognizes and addresses, in at least some embodiments, the issue of velocity estimation of an object having multiple reference points for the estimation, which points change over time as the object moves. Embodiments of this disclosure include systems, vehicles, and techniques that, individually or in combination, permit or otherwise facilitate generating an estimate of a velocity vector of a vehicle or another type of object in motion. While some embodiments of the disclosure are illustrated with reference to an automobile, the disclosure is not so limited. Indeed, the principles and practical elements disclosed herein can be applied to other types of vehicles (aircrafts (unmanned or otherwise), farm equipment, etc.) and moving objects.

Embodiments of the disclosure provide several technical benefits. For example, the techniques and systems or vehicles that implement the techniques can be robust with respect to temporal variations in detected reflection points about a vehicle or another type of object. More concretely, an estimate of a velocity vector of the vehicle, for example, can be performed regardless of changes in number and/or arrangement of the detected reflection points during the movement of the vehicle. The accuracy of the estimate of the velocity vector of the vehicle is superior to that provided by typical approaches.

With reference to the drawings, FIG. 1 presents an example of an operational environment 100 for estimation of velocity of an automobile 105, in accordance with one or more embodiments of the disclosure. The exemplified operational environment 100 is described with reference to an automobile simply for the sake of illustration. Indeed, the disclosure is not limited in that respect, and the principles and practical elements of this disclosure can be applied to other types of vehicles and moving objects.

The automobile 105 includes a sensing platform 110 that, at a defined instant during a trajectory of the automobile 105, can determine multiple detection points representative of defined locations about the automobile 105. Each one of the detection points can be determined from signals detected by the sensing platform 110. The signals that are detected can include one or more types of electromagnetic (EM) signals (e.g., radio waves or infrared light). In one aspect, the sensing platform 110 can detect EM signals at a defined rate f (a real number in units of frequency). Thus, data (analog or digital) generated in response to detected signals can be organized in frames. A frame is, or includes, a data structure that contains one or more datasets generated in response to signals detected at a defined instant or during a defined period. As such, a frame corresponds to a defined instant during a detection interval.

As is illustrated in FIG. 1, the sensing platform 110 can include a sensor system 120 that can generate multiple detection points for the automobile 105, in a defined frame. To that end, in one embodiment, the sensor system 120 can be embodied in, or can include, a radar system. In addition, or in other embodiments, the sensor system 120 can be embodied in, or can include, a light detection and ranging (LIDAR) system. In such embodiments, the detection points also can be referred to as reflection points.

As an illustration, at a defined instant $t_n$ (a real number in units of time) corresponding to a frame n (a natural number), the sensor system 120 can generate or otherwise determine a first group of detection points, including detection point $114_1$, detection point $114_2$, detection point $114_3$, detection point $114_4$, detection point $114_5$, detection point $114_6$, detection point $114_7$, and detection point $114_8$. The group of detection points is arranged about the automobile 105, with detection points $114_1$-$114_4$ and detection points $114_6$-$114_8$ being on the automobile 105. Detection point $114_5$ is outside a periphery of the automobile 105 and is referred to as an outlier detection point. The sensor system 120 can generate the first group of detection points by, for example, processing signals representative of electromagnetic radiation that impinges onto the automobile 105. In one example embodiment, the sensor system 120 can apply beamforming to received EM radiation received at an antenna array (not depicted in FIG. 1) included in the sensor system 120. The beamforming can result in the first group of detection points.

In another frame, such as a frame n+1 that is consecutive to frame n, corresponding to a defined instant $t_{n+1}$ (a real number in units of time), the sensor system 120 can generate or otherwise determine a second group of detection points including detection point $118_1$, detection point $118_2$, detection point $118_3$, detection point $118_4$, detection point $118_5$, detection point $118_6$, detection point $118_7$, detection point $118_8$, detection point $118_9$, and detection point $118_{10}$. The sensor system 120 also can generate the second group of detection points by, for example, processing signals representative of EM radiation that impinges onto the automobile 105. In one example embodiment, as mentioned, the sensor system 120 can apply beamforming to EM radiation received at the antenna array (not depicted in FIG. 1) included in the sensor system 120. The beamforming can result in the second group of detection points.

While the second group of detection points also is arranged about the automobile 105, the number of detection points in the second group is greater than the number of detection points in the first group. In addition, the arrangement of the detection points in the second group is different from the arrangement of the detection points in the first group. Therefore, traditional approaches would not contemplate these type of detection points in the estimation of a linear velocity of the automobile 105. Indeed, to estimate a velocity of an object, traditional approaches usually rely on a single reference position vector for the object and the changes of such position vector as a function of time. In sharp contrast, embodiments of the disclosure utilize multiple detection points about the automobile 105, which points are generated by the sensor system 120, to generate an estimate of a linear velocity vector of the automobile 105.

To at least that end, the sensory system 120 can provide (e.g., send and/or make available) data 130 representative of detection points in one or more frames to a velocity estimation system 140 included in the sensing system 110. The velocity estimation system 140 can receive or otherwise access at least a portion of the data 130. The velocity estimation system 140 can generate a velocity estimate 145 based at least on the received or otherwise accessed data. The velocity estimate 145 approximates the instantaneous velocity vector of the automobile 105 at a defined time. Thus, the velocity estimate 145 approximates a magnitude and an orientation of the instantaneous velocity vector of the automobile 105.

More specifically, the velocity estimation system 140 can receive first data indicative or otherwise representative of the first group of detection points pertaining to the frame n, at time $t_n$. Each detection point of the first group of detection points can be defined relative to an origin of a reference frame on the automobile 105. In addition, the velocity estimation system 140 can receive second data indicative or otherwise representative of the second group of detection points pertaining to frame n+1, at an instant $t_{n+1}$. Each detection point of the second group of detection points also can be defined relative to the origin of the reference frame on the automobile 105. Thus, for the sake of nomenclature, in FIG. 1, the first group of detection points can be referred to as arrangement 150 and the second group of detection points can be referred to as arrangement 160.

Further, the velocity estimation system 140 can generate one or more defined velocity vectors for the automobile 105. Each one of the defined velocity vector(s) is a hypothesis for the velocity of the automobile 105. As such, a defined velocity vector of the generated defined velocity vector(s) is referred to as a velocity vector hypothesis.

The velocity estimation system 140 can transform the first data representative of the group of detection points in the frame n into third data corresponding to a subsequent frame, such as frame n+1, using at least one of the one or more velocity vector hypotheses. The velocity estimation system 140 can propagate, for a time interval $\Delta t$, a position vector corresponding to a detection point in the frame n along a rectilinear trajectory according to a velocity vector hypothesis. Here, $\Delta t$ is a different between the instant $t_s$ associated with the subsequent frame and $t_n$. In one embodiment, to generate a velocity estimate 145 that approximates an instantaneous velocity at time $t_n$, the sequent frame can be frame n+1, which yields a smallest $\Delta t = t_{n+1} - t_n = 1/f$. In addition, the velocity estimation system 140 can generate a record indicative of a second location corresponding to the propagated position vector and can add the record to third data.

In an embodiment in which a group of N velocity vector hypotheses $\{v_1, v_2, \ldots v_N\}$ are generated, such transformations are pictorially represented in FIG. 1 as open circles, for three velocity vector hypotheses $v_1$ 155$_1$, $v_2$ 155$_2$, and $v_N$ 155$_N$ in respective arrangements 170$_1$, 170$_2$, and 170$_N$. Such arrangements also include detection points 118$_1$-118$_{10}$.

Upon or after generating the third data including transformed detection points from frame n, the velocity estimation system 140 can solve an optimization problem with respect to a volume of a convex hull of a union of the third data and second data indicative of the group of detection points in frame n+1. Such a volume can represent a cost function (or objective function) that is optimized to determine the velocity estimate 145. Solving the optimization problem can include minimizing such a volume over a domain of velocity vector hypotheses. Stated differently, solving the optimization problem can include determining a velocity vector hypothesis that yields a convex hull of the union of the third data and the second data that has a minimum volume relative to other such convex hulls. The velocity estimation system 140 can configure such a velocity vector hypothesis as the velocity estimate 145. Accordingly, by determining a suitable velocity vector hypothesis (the one that minimizes (within a defined minimization criterion) the geometric volume of a convex hull in accordance with this disclosure) the velocity estimation system 140 provides an approximate magnitude and approximate orientation for the instantaneous velocity vector of the automobile 105.

Each one of the group of N velocity vector hypotheses $\{v_1, v_2, \ldots v_N\}$ yields respective datasets, each including transformed detection points from the frame n to frame n+1 according to a respective velocity vector hypothesis $v_k$ (k=1, 2, \ldots N). Each convex hull resulting from a respective union of one such dataset and the second data representative of detection points in the frame n+1 has a geometric volume $V_{CH}$.

The velocity estimation system 140 can determine a geometric volume of a convex hull by identifying a point O within the convex hull and the volume of adding the geometric volumes of respective tetrahedra subtended by the point O and each facet of the convex hull. Therefore, configuring the point O at the origin of a reference system at the interior of the convex hull, the geometric volume $V_{CH}$ of the convex hull can be determined as follows:

$$V_{CH} = \frac{1}{3}\left|\sum_{\{F\}} S_F p_F^T n_F\right| \qquad (1)$$

Here, $\{F\}$ is the set of all facets of the convex hull, $S_F$ is the area of facet F, $n_F$ is the normal vector of face F, $p_F$ represents a defined point on the facet F (T indicates the transpose of $p_F$, or that the vector is in column format). It is noted that $n_F$ is a unit vector oriented toward the exterior of the convex hull, at facet F. It also noted that the product $p_F^T n_F$ equals to a height of a vector from O to the facet F.

Accordingly, the velocity estimation system 140 generates a convex hull volume $V_{CH}^{(k)}$ for each velocity hypothesis vector $v_k$. Based at least on the convex hull volumes $\{V_{CH}^{(1)}, V_{CH}^{(2)}, \ldots V_{CH}^{(k)}\}$ (k=1, 2, \ldots N), the velocity estimation system 140 can solve the foregoing optimization problem and, therefore, generate the velocity estimate 145. In some embodiments, the group of N velocity vector hypotheses can be represented as a grid of candidate velocity vector components. The grid can be two-dimensional (2D) or three-dimensional (3D) depending on the type of estimate being generated. More specifically, a 3D grid can be formed by a collection of points (in velocity space) having first velocity components along a first versor of a reference system, second velocity components along a second versor of the reference system, and third components along a third versor of the reference system. A 2D grid can be formed similarly. An example of a 2D grid is shown in diagram 180 in FIG. 1 for N=25. While the 2D grid is represented as a square lattice having uniform density of points, other types of lattices can be contemplated. The same applies to 3D grids for three-dimensional velocity vector hypotheses.

In diagram 180, geometric volumes of respective convex hulls corresponding to respective velocity vector hypothesis are represented using the area of respective circles in the 2D grid. Circles having greater area represent convex hulls having greater volume. Therefore, in the illustrated scenario, the velocity estimation system 140 can determine that the velocity vector hypothesis corresponding to the center of the 2D grid yields a minimum volume. Accordingly, the velocity estimation system 140 can configure such a velocity vector hypothesis as the velocity estimate 145 in such a 2D example scenario.

Other approaches besides a grid (or, more generally, a domain) of candidate velocity vectors can be utilized to solve the optimization problem that yields the velocity estimate 145. For example, the velocity estimation system 140 can implement a gradient-based approach where the velocity estimation system 140 iteratively updates a current velocity vector hypothesis so as to traverse a velocity space in a direction that progressively reduces a volume of convex hull generated using a current velocity vector hypothesis. The velocity estimation system 140 can cease updating a current velocity vector hypothesis in response to a termination (or convergence) criterion being satisfied. Such a current velocity vector hypothesis can satisfactorily solve the optimization problem and, thus, the velocity estimation system can configure the current velocity vector hypothesis as the velocity estimate 145.

Figure 2A:
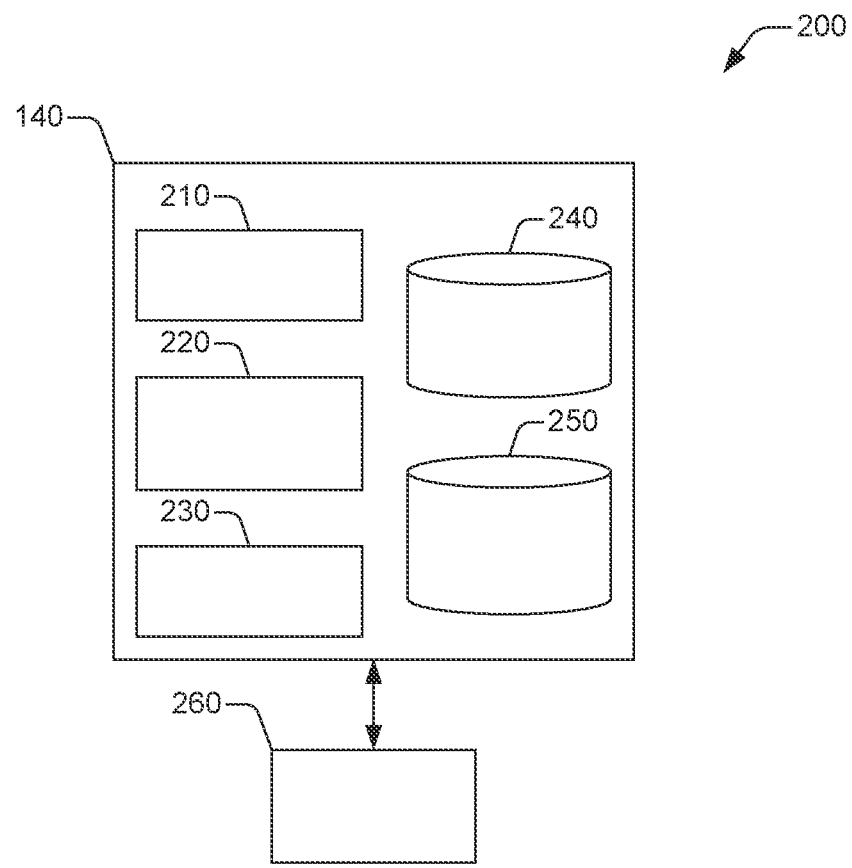
FIG. 2A presents an example of a system for estimation of velocity of an automobile, in accordance with one or more embodiments of the disclosure.

FIG. 2A presents a block-diagram 200 of an example of a velocity estimation system 140 for the estimation of a velocity of an object, in accordance with one or more embodiments of the disclosure. The illustrated velocity estimation system 140 includes a conditioning component 210 that receives data (digital or analog) from the sensor system 120, FIG. 1, or other sensor systems included in an automobile or other types of vehicles. The illustrated velocity estimation system 140 also includes a convex hull generator component 220 that can generate union datasets in accordance with aspects described herein. In addition, the illustrated velocity estimation system 140 can include an optimization component 230 that can utilize or otherwise leverage convex hulls in accordance with this disclosure to generate an estimate of a velocity vector for an automobile or other types of vehicles.

The velocity estimation system 140 also includes one or more memory devices 240 (generically referred to as detection point data 240) that includes data received from the sensor system 120 or a similar sensor system. The velocity estimation system 140 also includes one or more second memory devices 250 (generically referred to as velocity estimation data 250) that can include information (e.g., data, metadata, and/or logic) to generate an estimate of a velocity vector of an automobile or another type of vehicle.

The velocity estimation system 140 can be functionally coupled (e.g., communicatively coupled) to a control system 260 that can implement a control process to adjust or otherwise control the operation of an automobile or other types of vehicles that includes the control system 260.

Figure 2B:
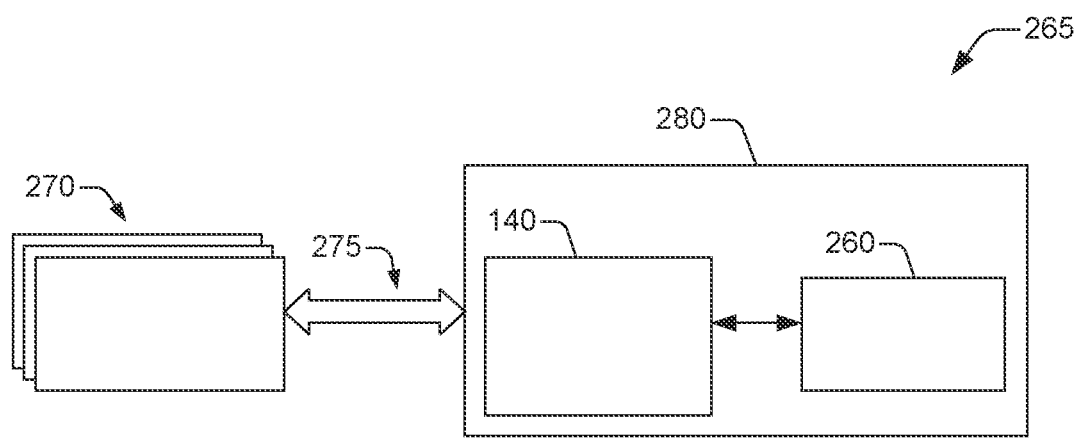
FIG. 2B presents another example of a system for estimation of velocity of an automobile, in accordance with one or more embodiments of the disclosure.

FIG. 2B presents a block diagram of another example of a computing system 265 to generate an estimate of a velocity vector of an automobile or other types of vehicles in accordance with aspects of this disclosure. As is illustrated in FIG. 2B, the computing system 265 can include one or more processors 270 and one or more memory devices 280 (generically referred to as memory 280) that include machine-accessible instructions (e.g., computer-readable and/or computer-executable instructions) that can be accessed and executed by at least one of the processor(s) 270. In one example, the processor(s) 270 can be embodied in or can constitute a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), a combination thereof, or the like. In some embodiments, the processor(s) 270 can be arranged in a single computing apparatus (e.g., an electronic control unit (ECU), and in-car infotainment (ICI) system, or the like). In other embodiments, the processor(s) 270 can be distributed across two or more computing apparatuses (e.g., multiple ECUs; a combination of an ICI system and one or several ECUs; or the like).

The one or more processors 270 are functionally coupled to the memory 280 by means of a communication structure 275. The communication structure 275 is suitable for the particular arrangement (localized or distributed) of the processor(s) 270. In some embodiments, the communication structure 275 can include one or more of bus architectures, such an Ethernet-based industrial bus, a controller area network (CAN) bus, a Modbus, other types of fieldbus architectures, or the like.

As is illustrated in FIG. 2B, the memory 280 includes the velocity estimation system 140. As such, machine-accessible instructions (e.g., computer-readable and/or computer-executable instructions) embody or otherwise constitute the velocity estimation system 140. The machine-accessible instructions are encoded in the memory 280 and can be arranged in components that can be built (e.g., linked and compiled) and retained in computer-executable form in the memory 280 (as is shown) or in one or more other machine-accessible non-transitory storage media. At least one of the processor(s) 270 can execute the velocity estimation system 140 to cause the computing system 265 to generate an estimate of a velocity vector of an automobile or other type of vehicles.

Similarly, the memory 280 also can retain or otherwise store the control system 260. As such, machine-accessible instructions (e.g., computer-readable and/or computer-executable instructions) embody or otherwise constitute the control system 260. Again, the machine-accessible instructions are encoded in the memory 280 and can be arranged in components that can be built (e.g., linked and compiled) and retained in computer-executable form in the memory 280 (as is shown) or in one or more other machine-accessible non-transitory storage media. At least one of the one or more processors 270 can execute the control system 260 to cause the computing system 265 to implement a control process to adjust or otherwise control the operation of the automobile or other types of vehicles. To that end, in one aspect, the control process can utilize or otherwise rely on a velocity vector estimate generated by the velocity estimation system 140. The operation of the vehicle can be controlled based at least on a magnitude of the velocity vector estimate and/or an orientation of the velocity vector estimate.

It is noted that, while not illustrated in FIG. 2B, the computing system 265 also can include other types of computing resources (e.g., interface(s) (such as I/O interfaces; controller devices(s); power supplies; and the like)

that can permit or otherwise facilitate the execution of the software components. To that point, for instance, the memory 280 also can include programming interface(s) (such as application programming interfaces (APIs)), an operating system, firmware, and the like.

Figure 3A:
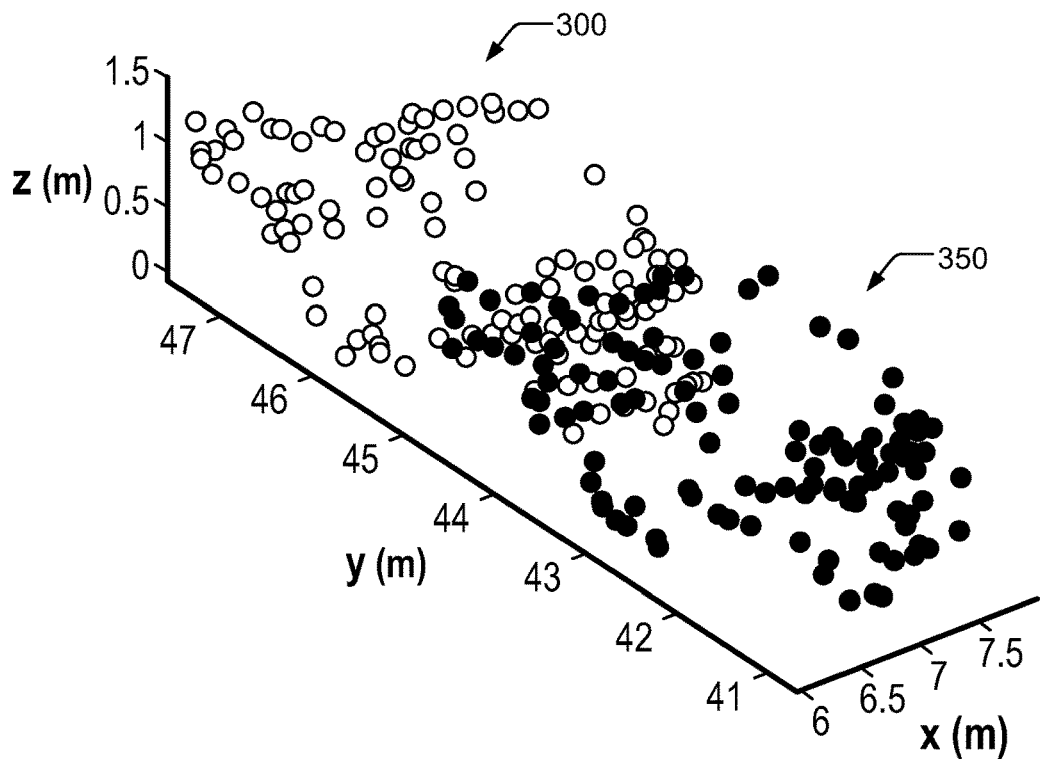
FIG. 3A presents a perspective view of an example of detection points for estimation of velocity of an automobile, in accordance with one or more embodiments of the disclosure.
Figure 3B:
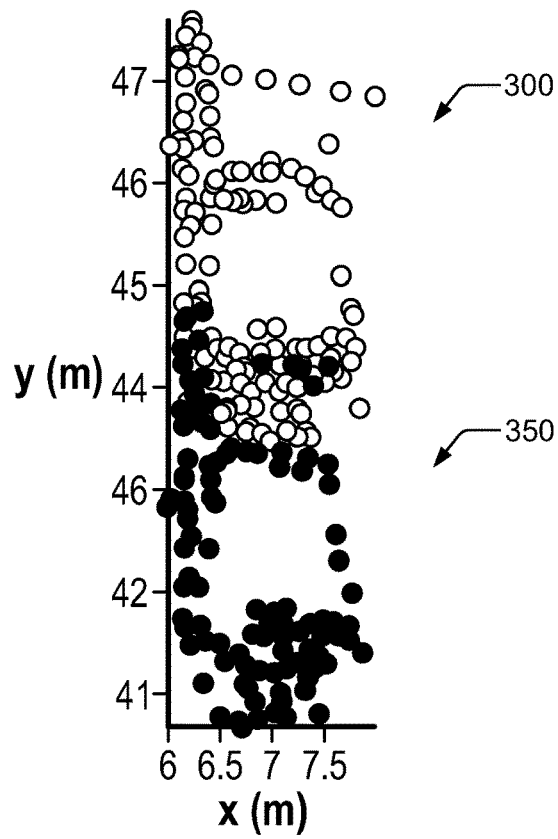
FIG. 3B presents a top view of the example of detection points shown in FIG. 3A.

FIG. 3A presents a perspective view of an example of detection points for estimation of velocity of an automobile, in accordance with one or more embodiments of the disclosure. FIG. 3B presents a top view of the example of detection points shown in FIG. 3A. The illustrated detection points are observed reflection points for an automobile (not depicted in these figures). The illustrated detection points can be determined by a high-resolution radar system that embodies or constitutes the sensor system 120 in FIG. 1. The illustrated detection points include a first set of detection points 300 corresponding a first frame and a second set of detection points 350 corresponding to a second frame consecutive to the first frame. The arrangement and number of detection points in the first group of detection points 300 is different from the arrangement and number of detection points in the second group of detection points 350.

Figure 4A:
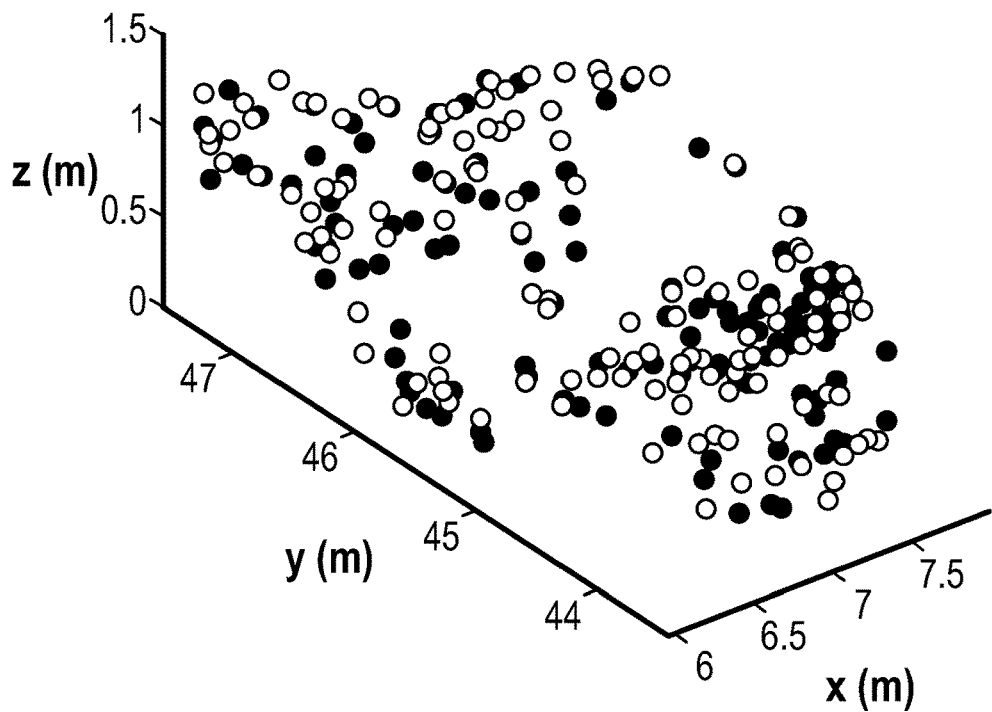
FIG. 4A presents a perspective view of an example of a union dataset of detection points for estimation of velocity of an automobile, in accordance with one or more embodiments of the disclosure.
Figure 4B:
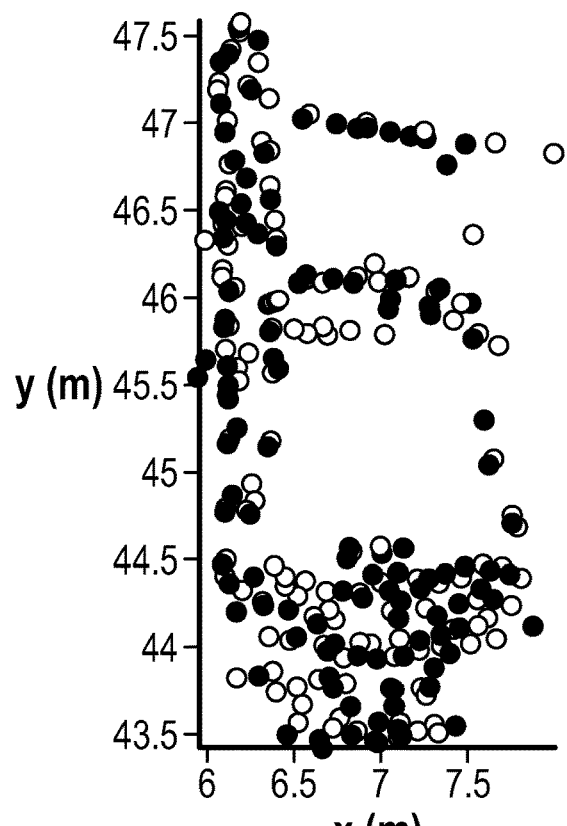
FIG. 4B presents a top view of the example of detection points shown in FIG. 4A.

FIG. 4A presents a perspective view of an example of a union dataset of detection points for estimation of the velocity of an automobile, in accordance with one or more embodiments of the disclosure. FIG. 4B presents a top view of the example of detection points shown in FIG. 4A. The union dataset in FIG. 4A (and also in FIG. 4B) results from transforming the first group of detection points 300 in FIG. 3A using a defined velocity vector hypothesis and generating a union of the transformed group of detection points and the second group of detection points 350 shown in FIG. 3A. The defined velocity vector hypothesis is essentially equal to v=(0.0 m/s, −11.1 m/s).

Figure 5A:
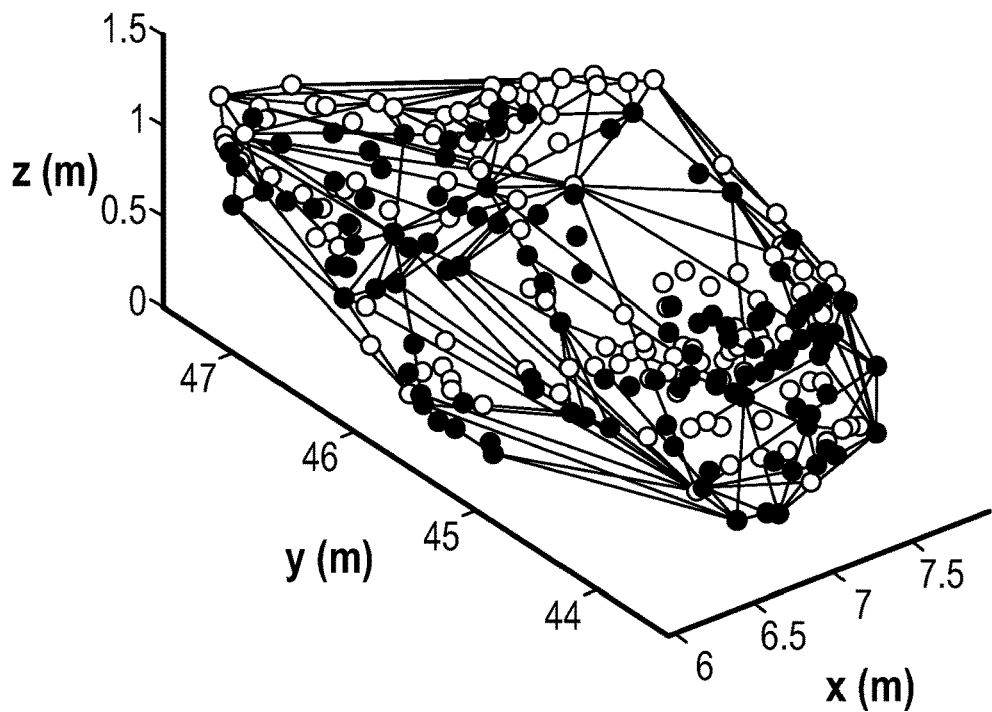
FIG. 5A presents a perspective view of a convex hull of the union dataset of detection points illustrated in FIG. 4A, in accordance with one or more embodiments of the disclosure.
Figure 5B:
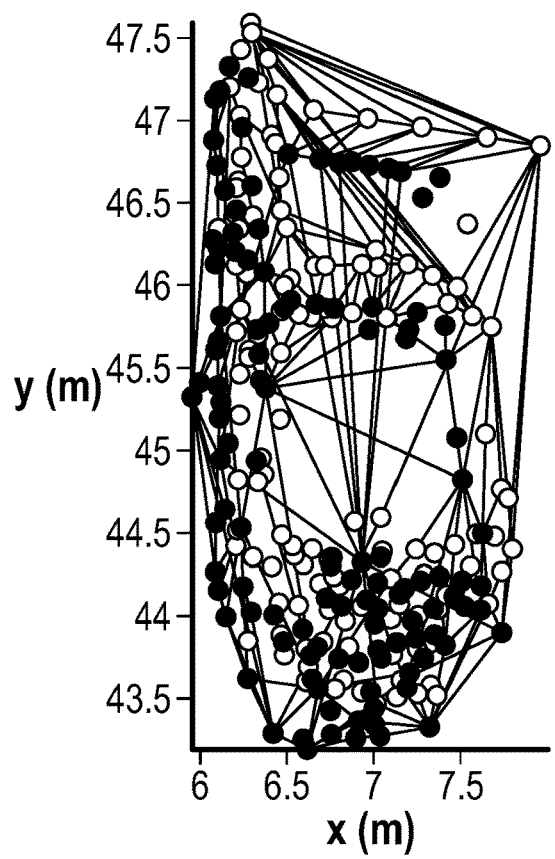
FIG. 5B presents a top view of the convex hull shown in FIG. 5A.

FIG. 5A presents a perspective view of a convex hull of the union dataset of detection points illustrated in FIG. 4A, in accordance with one or more embodiments of the disclosure. FIG. 5B presents a top view of the convex hull shown in FIG. 5A.

Figure 6:
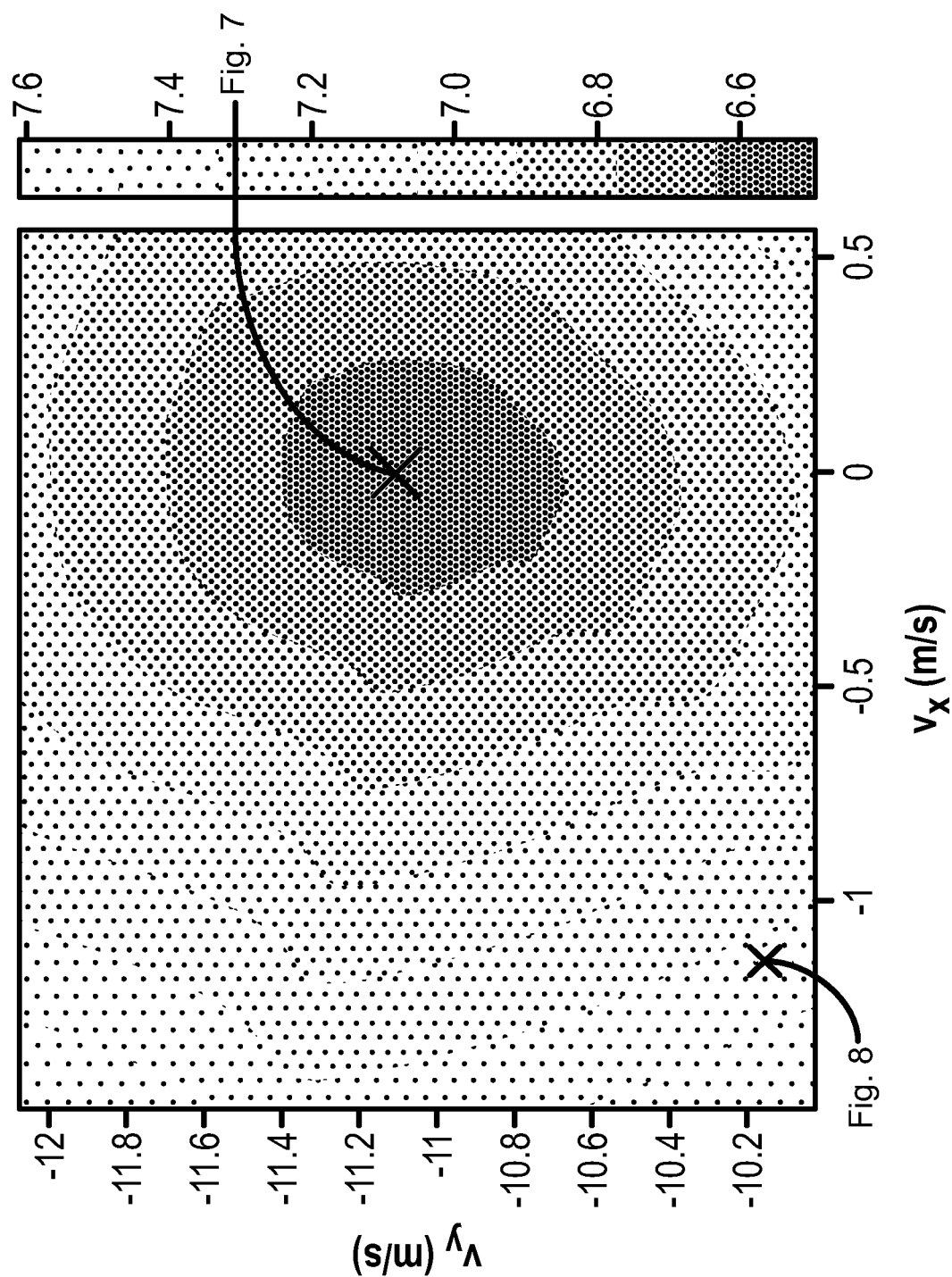
FIG. 6 presents a two-dimensional projection of volumes of convex hulls as a function of two-dimensional velocity vector hypotheses, in accordance with one or more embodiments of the disclosure.
Figure 7:
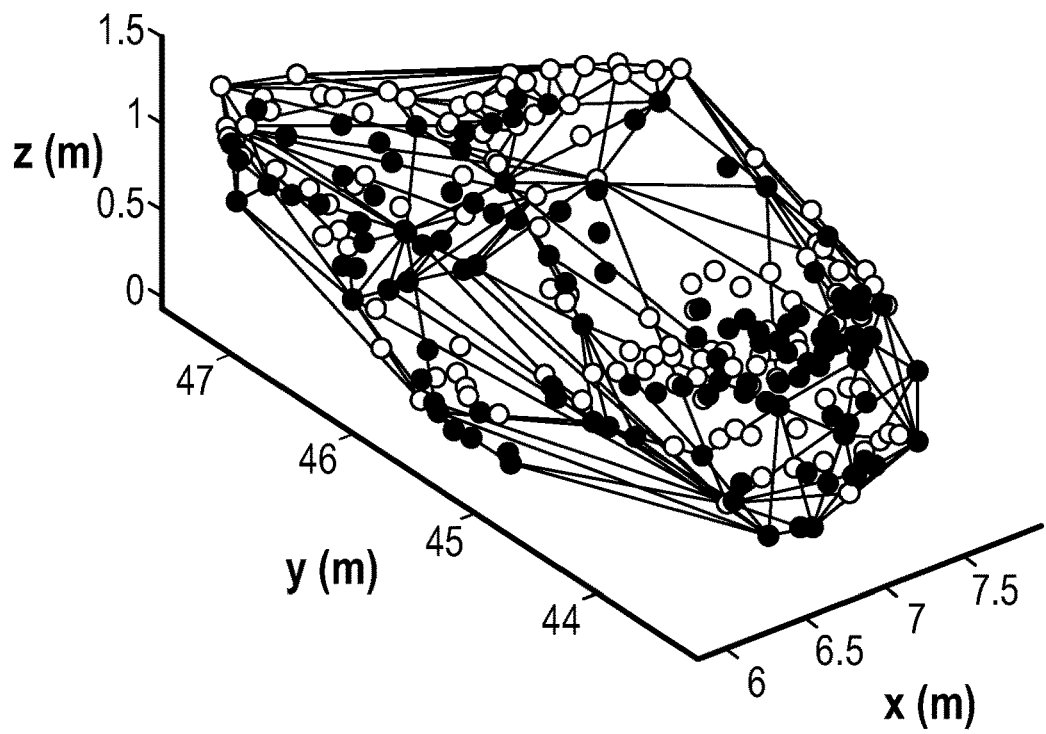
FIG. 7 presents a perspective view of an example of a convex hull corresponding to a defined velocity vector hypothesis, in accordance with one or more embodiments of the disclosure.
Figure 8:
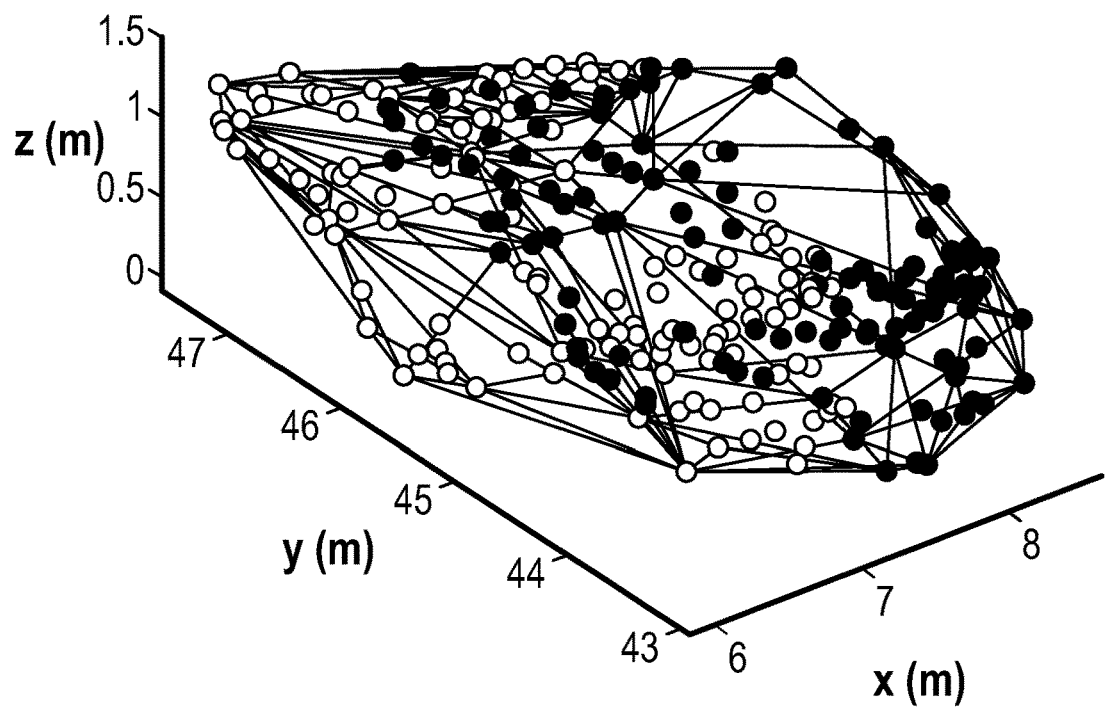
FIG. 8 presents a perspective view of an example of a convex hull corresponding to another defined velocity vector hypothesis, in accordance with one or more embodiments of the disclosure.
Figure 9:
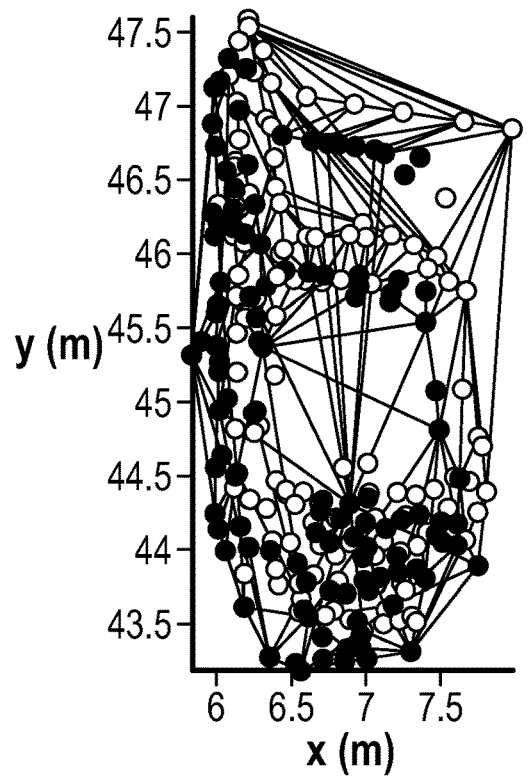
FIG. 9 presents a top view of the convex hull illustrated in FIG. 7.
Figure 10:
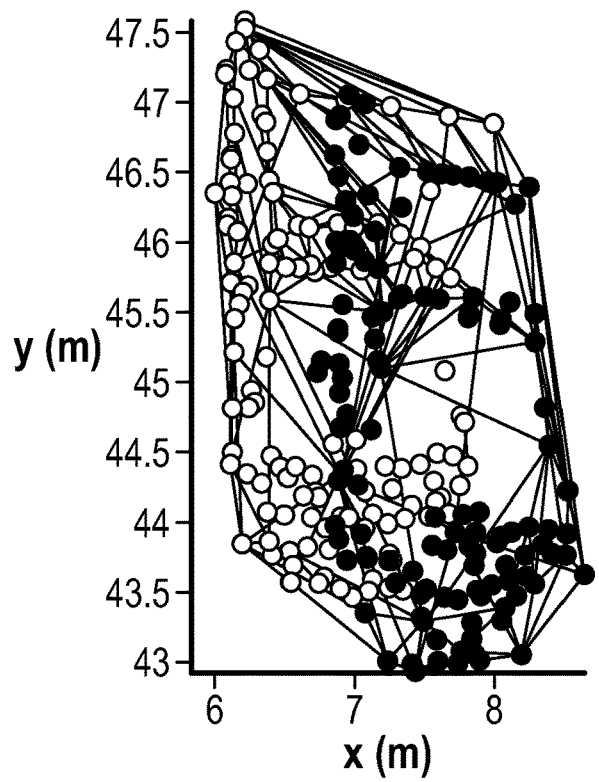
FIG. 10 presents a top view of the convex hull illustrated in FIG. 8.

FIG. 6 presents a two-dimensional projection of examples of geometric volumes of convex hulls in accordance with aspects of this disclosure, as a function of two-dimensional velocity vector hypotheses. The convex hulls are determined using at least a 2D grid of velocity vector hypotheses. As is disclosed herein, a minimum for the geometric volumes is present for a defined velocity vector hypothesis (pictorially identified with a cross symbol) having a first component $v_x \cong 0$ m/s, along a first direction in space, and a second component $v_y \cong -11.1$ m/s, along a second direction. FIG. 7 illustrates the convex hull corresponding to the defined velocity vector hypothesis, and FIG. 8 illustrates a convex hull corresponding to a velocity vector hypothesis that yields a non-minimal geometric volume, as is referenced in FIG. 6 using lead lines. FIG. 9 and FIG. 10 present, respectively, a top view of the convex hull illustrated in FIG. 7 and a top view of the convex hull illustrated in FIG. 8.

Figure 11A:
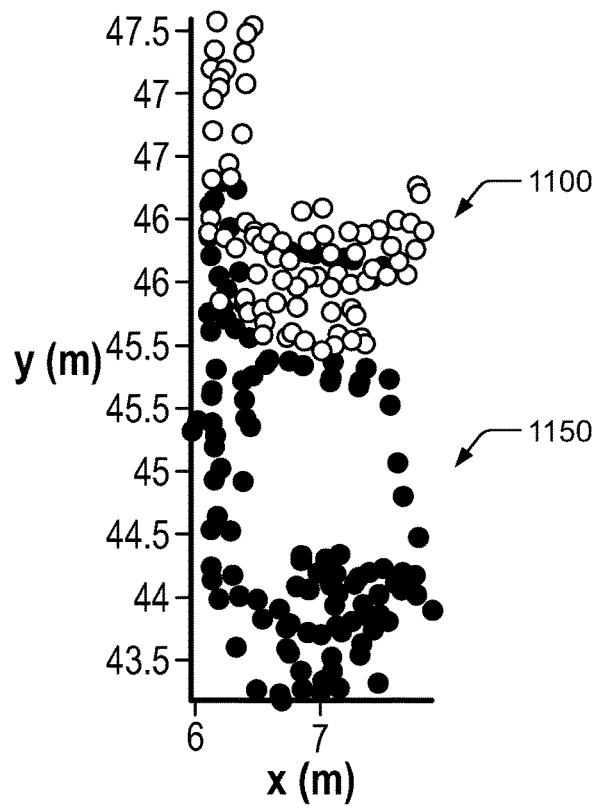
FIG. 11A presents a top view of examples of detection points in an automobile, in accordance with one or more embodiments of the disclosure.

As mentioned, the embodiments of the disclosure for estimation of a velocity vector of a moving object generate estimates of velocity that are more accurate than estimates generated using typical approaches. More specifically, FIG. 11A presents a top view of examples of detection points in an automobile, for a first frame and a second frame consecutive to the first frame, in accordance with one or more embodiments of the disclosure. The illustrated detection points include a first group of detection points 1100 corresponding to a first frame and a second group of detection points 1150 corresponding to a second frame. As it can be gleaned from the FIG. 11A, the arrangement of the detection points in the first group of detection points 1100 is clearly different from the arrangement of the detection points in the second group of detection points 1150. In the latter, a greater number of detection points are present on lateral portions (e.g., portions along they direction in FIG. 11A) of the automobile. Further, in one of the lateral portions, some of the detection points in the second group 1150 cover a greater span of the automobile (not depicted) than the first group of detection points 1100.

Figure 11B:
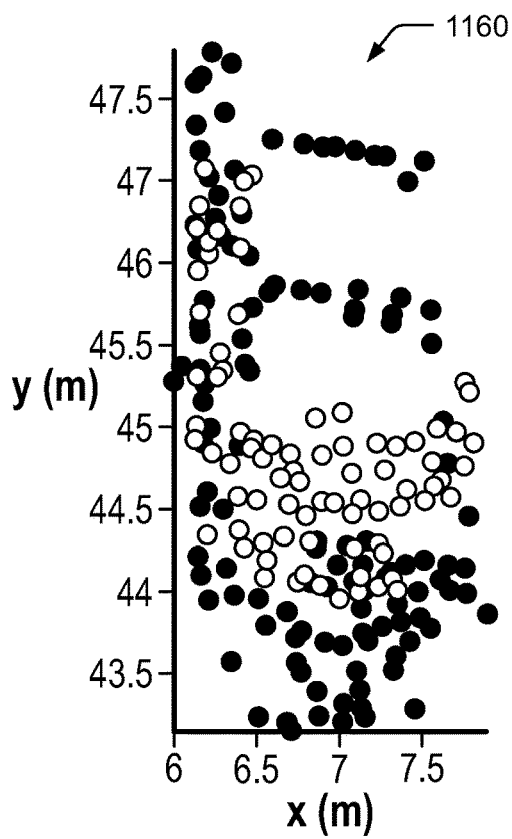
FIG. 11B presents a top view of other examples of detection points in an automobile, in accordance with one or more embodiments of the disclosure.

FIG. 11B presents a perspective view of an example of a union dataset 1160 of detection points for estimation of velocity of an automobile using a common approach. In such common approach the centroid point of the first group of detection points 1100 is translated from the first frame to the second frame. To that end, the centroid of the first group of detection points 1100 is propagated according to a velocity vector estimated using the position offset of the centroid of the second group of detection points relative to the centroid of the first group of detection points, and the time interval $\Delta t = 1/f$ (the time interval between consecutive frames). A velocity estimation for the automobile, using such a centroid-based approach yields an estimation error of about 3.1 m/s.

Yet, without intending to be bound by theory and/or modeling, it is expected that the differences in number of detection points and arrangement of detections between the first group and second group can introduce uncertainty in a velocity estimation that relies on centroid points. Indeed, the velocity estimation system 140 can generate an estimate of the velocity of the automobile for which the first and second group of detection points are detected that is nearly three times more accurate than velocity estimate produced by the commonplace centroid-based approach. The approach of this disclosure yields a velocity estimate that has an estimate error of about 0.9 m/s.

Figure 11C:
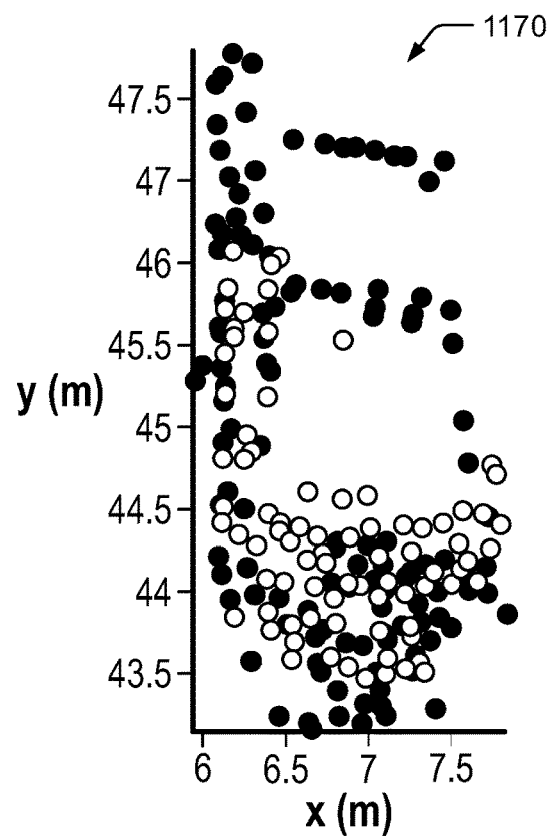
FIG. 11C presents a top view of yet other examples of detection points in an automobile, in accordance with one or more embodiments of the disclosure.

FIG. 11C presents a perspective view of an example of a union dataset 1170 of detection points for estimation of velocity of an automobile, in accordance with one or more embodiments of the disclosure. The union dataset 1170 results from transforming the first group of detection points 1100 in FIG. 11A using a velocity vector hypothesis that solves an optimization problem with respect to a volume of a convex hull of a union of data representative of the first group of detection points and data representative of the second group of detection points 1150.

Figure 12:
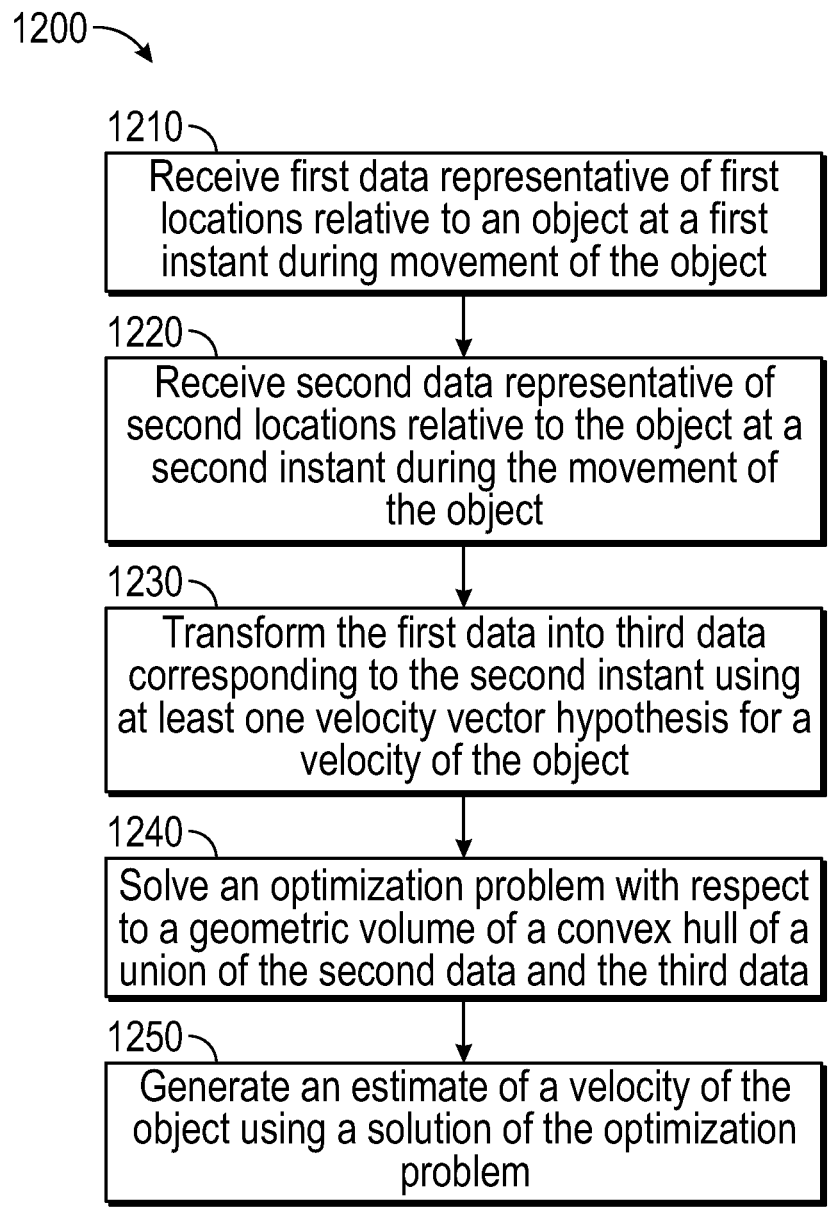
FIG. 12 presents an example of a method for generating an estimate of a velocity of an object in accordance with one or more embodiments of the disclosure.
Figure 13:
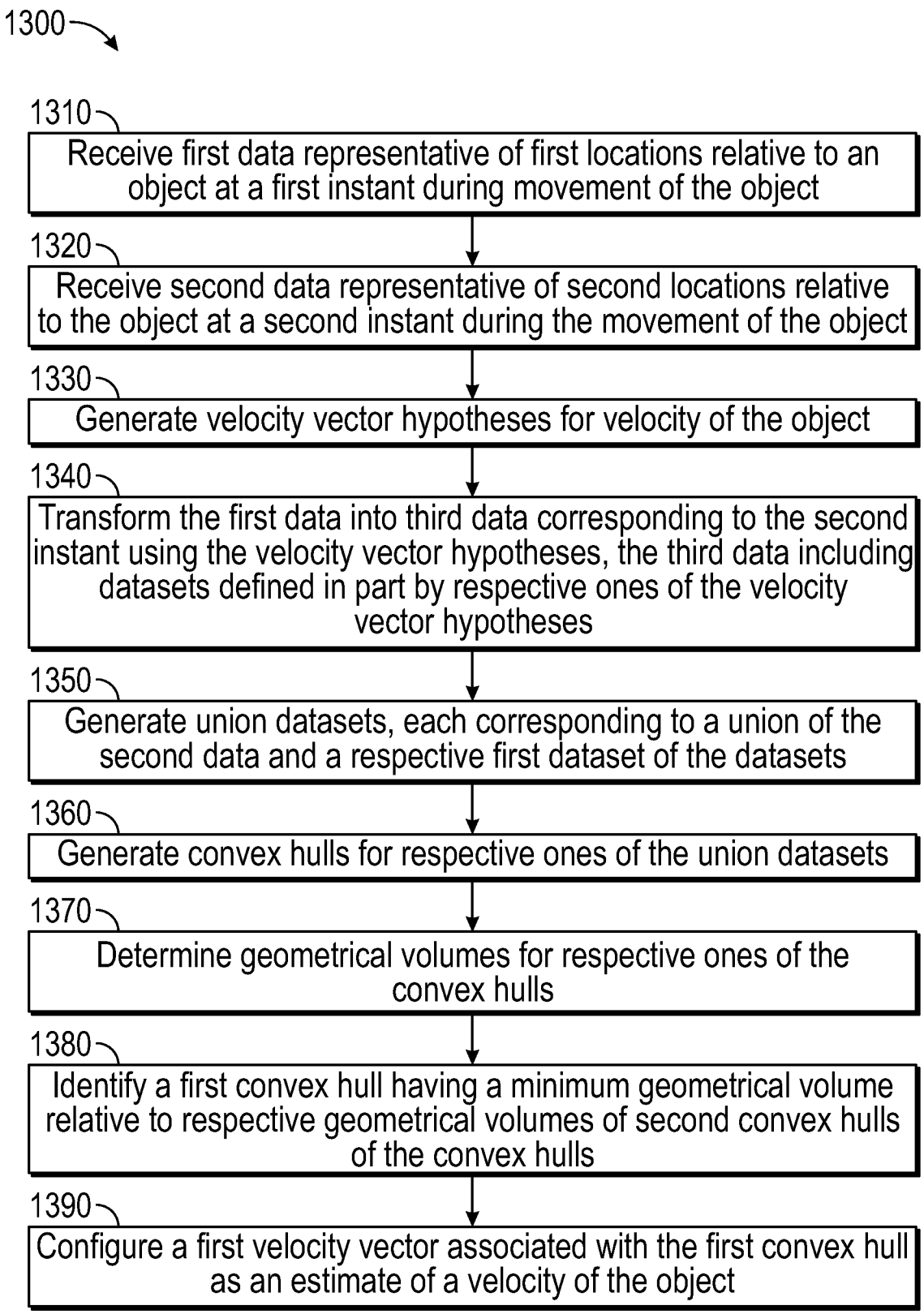
FIG. 13 presents another example of method for generating an estimate of a velocity of an object in accordance with one or more embodiments of the disclosure.
Figure 14:
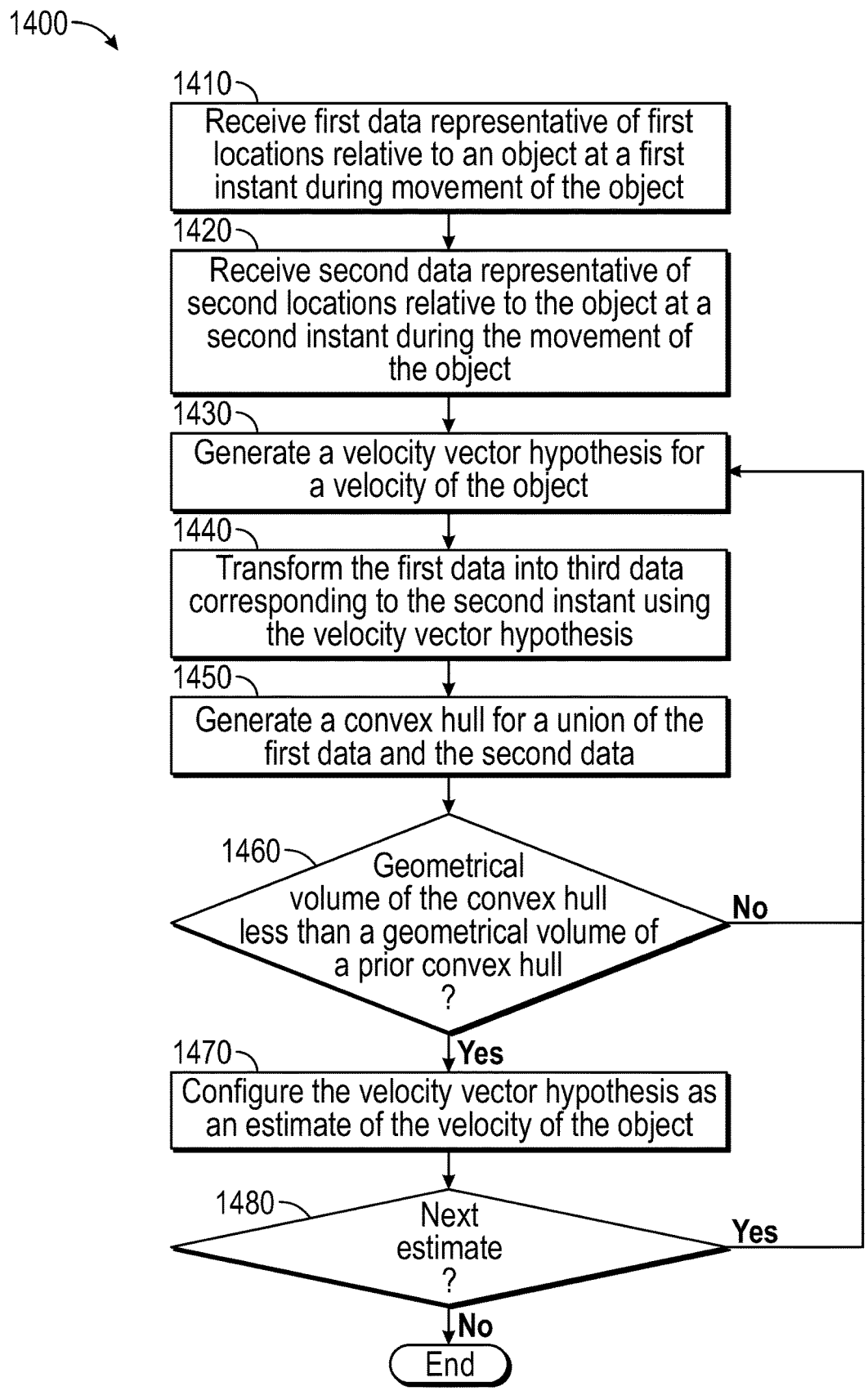
FIG. 14 presents yet another example of method for generating an estimate of a velocity of an object in accordance with one or more embodiments of the disclosure.

In view of various aspects described herein, examples of the methods that can be implemented in accordance with this disclosure can be better appreciated with reference to FIGS. 12-14. For purposes of simplicity of explanation, the exemplified methods (and other techniques disclosed herein) are presented and described as a series of operations. It is noted, however, that the exemplified methods and any other techniques of this disclosure are not limited by the order of operations. Some operations may occur in different order than that which is illustrated and described herein. In addition, or in the alternative, some operations can be performed essentially concurrently with other operations (illustrated or otherwise). Further, not all illustrated operations may be required to implement an exemplified method or technique in accordance with this disclosure. Furthermore, in some embodiments, two or more of the exemplified methods and/or other techniques disclosed herein can be implemented in combination with one another to accomplish one or more elements and/or technical improvements disclosed herein.

In some embodiments, one or several of the example methods and/or other techniques disclosed herein can be represented as a series of interrelated states or events, such as in a state-machine diagram. Other representations also are possible. For example, interaction diagram(s) can represent an exemplified method and/or a technique in accordance with this disclosure in scenarios in which different entities perform different portions of the disclosed methodologies.

It noted that at least some of the techniques disclosed herein can be retained or otherwise stored on an article of manufacture (such as a computer-program product) to permit or otherwise facilitate transporting and transferring such example methods to a computing apparatus for execution, and thus implementation, by processor(s) or for storage in a memory.

Techniques disclosed throughout the subject specification and annexed drawings are capable of being stored on an article of manufacture to facilitate transporting and transferring such methodologies to computers or other types of information processing machines or processing circuitry for execution, and thus implementation by a processor or for storage in a memory device or another type of computer-readable storage device. In one example, one or more processors that perform a method or combination of methods disclosed herein can be utilized to execute programming code instructions retained in a memory device or any computer-readable or machine-readable storage device or non-transitory storage media, to implement one or several of the exemplified methods and/or other techniques disclosed herein. The programming code instructions, when executed by the one or more processors can implement or carry out the various operations in the exemplified methods and/or other technique disclosed herein.

The programming code instructions, therefore, provide a computer-executable or machine-executable framework to implement the exemplified methods and/or other techniques disclosed herein. More specifically, yet not exclusively, each block of the flowchart illustrations and/or combinations of blocks in the flowchart illustrations can be implemented by the programming code instructions.

FIG. 12 presents a flowchart of an example method 1200 for generating an estimate of a velocity of an object in accordance with one or more embodiments of the disclosure. As mentioned, the object can be embodied in vehicle, such as an automobile, an aircraft (manned or unmanned); agricultural machinery; or the like. The example method 1200 can be implemented, entirely or in part, by a computing system having one or more processors; one or more memory devices; other types of computing resources; a combination thereof; or the like. In some embodiments, the computing system can be embodied in, or can include, the velocity estimation system 140 disclosed herein.

At block 1210, the computing system can receive first data representative of first locations relative to an object at a first instant (e.g., $t_n$ in FIG. 1) during movement of the object. For instance, the first instant can correspond to $t_n$ described herein. The first locations are defined relative to an origin of a reference frame on the object. At block 1220, the computing system can receive second data indicative of second locations relative to the object at a second instant during the movement of the object. The second instant can correspond to $t_{n+1}$ described herein, for example. The second locations also are defined relative to the origin of the reference frame.

At block 1230, the computing system can transform the first data into third data corresponding to the second instant using at least one velocity vector hypothesis for the velocity object. At block 1240, the computing system can solve an optimization problem with respect to a volume of a convex hull of a union of the second data and the third data. As mentioned, such a volume can represent a cost function (or objective function) that is optimized to determine an estimate of a velocity of the object. As further mentioned, solving the optimization problem can include minimizing the volume of a convex hull of a union of the second data and the third data.

Regardless of the manner of solving the optimization problem, at block 1250, the computing system can generate the estimate of the velocity of the object using at least a solution of the optimization problem. FIGS. 13 and 14 present flowcharts of example methods 1300 and 1400, respectively, to generate an estimate of a velocity of an object in accordance with one or more embodiments of the disclosure.

FIG. 13 presents a flowchart of an example method 1300 for generating an estimate of a velocity of an object in accordance with one or more embodiments of the disclosure. Again, the object can be embodied in a vehicle, such as an automobile, an aircraft (manned or unmanned); agricultural machinery; or the like. The example method 1300 can be implemented, entirely or in part, by a computing system having one or more processors; one or more memory devices; other types of computing resources; a combination thereof; or the like. In some embodiments, the computing system can be embodied in, or can include, the velocity estimation system 140 disclosed herein.

Blocks 1310 and 1320 are respectively equivalent to block 1210 and 1220 in example method 1200. Thus, at block 1310, the computing system can receive first data representative of first locations relative to an object at a first instant (e.g., $t_n$) during movement of the object. The first locations defined relative to an origin of a reference frame on the object. In addition, at block 1320, the computing system can receive second data indicative of second locations relative to the object at a second instant during (e.g., $t_{n+1}$) the movement of the object. The second locations also are defined relative to the origin of the reference frame.

At block 1330, the computing system can generate several velocity vector hypotheses for velocity of the object. In one embodiment, as mentioned, the velocity vector hypotheses can be represented as a grid of candidate velocity vector components. The grid can be two-dimensional (2D) or three-dimensional (3D) depending on the type of estimate being generated. At block 1340, the computing system can transform the first data into third data corresponding to the second instant using the velocity vector hypotheses. The third data includes datasets defined in part by respective one of the velocity vector hypotheses.

At block 1350, the computing system can generate union datasets, each corresponding to a union of the second data and a respective first dataset of the datasets. At block 1360, the computing system can generate convex hulls for respective ones of the union datasets. Each one of the convex hulls based at least on a respective velocity vector of the group of defined velocity vectors.

At block 1370, the computing system can determine geometric volumes for respective ones of the convex hulls. At block 1380, the computing system can identify a first convex hull having a minimum geometric volume relative to respective geometric volumes of second convex hulls of the convex hulls. At block 1390, the computing system can configure a first velocity vectors associated with the first convex hull as an estimate of a velocity of the object.

FIG. 14 presents a flowchart of an example method 1400 for generating an estimate of a velocity of an object in accordance with one or more embodiments of the disclosure.

The object can be embodied in a motorized vehicle, an aircraft (manned or unmanned); agricultural machinery; or the like. The example method 1300 can be implemented, entirely or in part, by a computing system having one or more processors; one or more memory devices; other types of computing resources; a combination thereof; or the like. In some embodiments, the computing system can be embodied in, or can include, the velocity estimation system 140 disclosed herein.

Blocks 1410 and 1420 are respectively equivalent to block 1210 and 1220 in example method 1200. Thus, at block 1410, the computing system can receive first data representative of first locations relative to an object at a first instant (e.g., $t_n$) during movement of the object. The first locations defined relative to an origin of a reference frame on the object. In addition, at block 1420, the computing system can receive second data indicative of second locations relative to the object at a second instant during (e.g., $t_{n+1}$) the movement of the object. The second locations also are defined relative to the origin of the reference frame.

At block 1430, the computing system can generate a velocity vector hypothesis for a velocity of the object. As mentioned, the velocity vector hypothesis is a candidate to represent a velocity vector of the object. At block 1440, the computing system can transform the first data into third data corresponding to the second instant using the velocity vector hypothesis. At block 1450, the computing system can generate a convex hull for a union of the first data and the second data.

At block 1460, the computing system can assess if a geometric volume of the convex hull is less than another geometric volume of a prior convex hull. The prior convex hull can be determined, for example, by implementing blocks 1440 and 1450, from a prior generated velocity vector hypothesis. In response to a negative determination ("No" branch), the flow of the example method 1400 can be directed to block 1430. In the alternative, in response to a positive determination ("Yes" branch), the flow can be directed to block 1470, at which the computing system can configure the velocity vector hypothesis as an estimate of the velocity of the object.

Such an estimate can be referred to as a current estimate. At block 1480, the computing system can determine if a next estimate is necessary. For instance, while the geometric volume has decreased relative to the geometric volume of the prior convex hull, the decrement may be greater than a threshold amount. Therefore, a search for an updated estimate is warranted in order to generate another estimate that can yield a next convex hull having a smaller geometric volume. As such, flow of the example method 1400 can be directed to block 1430.

In the alternative, the example method 1400 can end in response to ascertaining, at block 1480, that the configured estimate of velocity is satisfactory—e.g., the geometric volume has decreased relative to the geometric volume of the prior convex hull by an amount that is less than the threshold amount.

Figure 15:
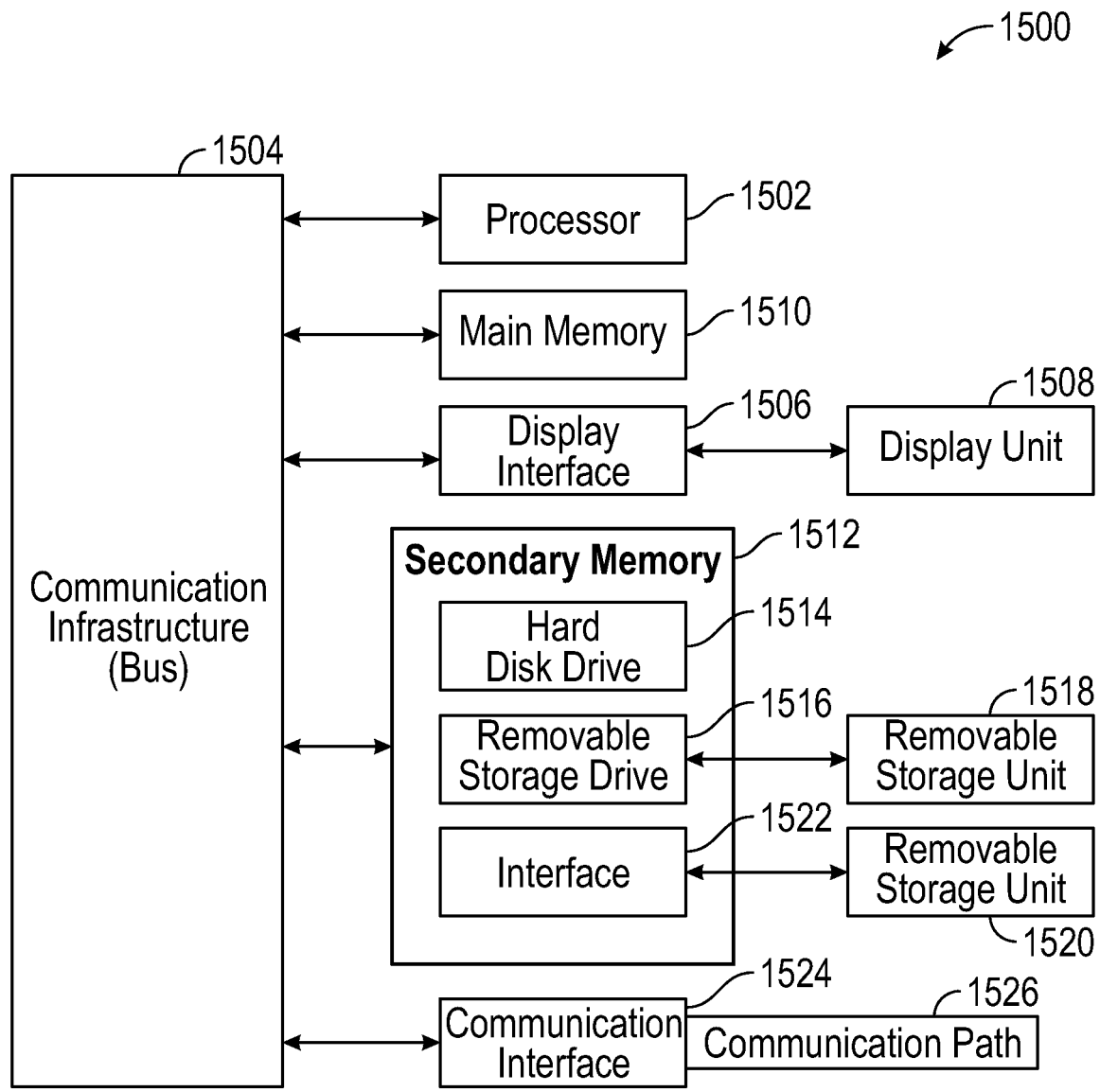
FIG. 15 depicts a high-level block diagram of a computing system, which can be used to implement one or more embodiments.

FIG. 15 depicts a high-level block diagram of a computing system 1500, which can be used to implement one or more embodiments. Computing system 1500 can correspond to, at least, a system that is configured to test various systems, for example. Computing system 1500 can correspond to an interface device, a conversion device, and/or a network simulation device. Computing system 1500 can be used to implement hardware components of systems configured to perform the numerous methods described herein (e.g., methods 1200, 1300, 1400). Although one example computing system 1500 is shown, computing system 1500 includes a communication path 1526, which connects, via a communication interface 1524, the computing system 1500 to one or more additional systems (not depicted in FIG. 15). Computing system 1500 and the additional system(s) can be in communication via the communication path 1526 and the communication interface 1524, e.g., to communicate data between them.

Computing system 1500 includes one or more processors, such as processor 1502. Processor 1502 is connected to a communication infrastructure 1504 (e.g., a communications bus, cross-over bar, or network). Computing system 1500 can include a display interface 1506 that forwards graphics, textual content, and other data from communication infrastructure 1504 (or from a frame buffer not shown) for display on a display unit 1508. Computing system 1500 also includes a main memory 1510, preferably random access memory (RAM), and can also include a secondary memory 1512. There also can be one or more disk drives 1514 contained within secondary memory 1512. Removable storage drive 1516 reads from and/or writes to a removable storage unit 1518. As will be appreciated, removable storage unit 1518 includes a computer-readable medium having stored therein computer software and/or data.

In alternative embodiments, secondary memory 1512 can include other similar means for allowing computer programs or other instructions to be loaded into the computing system. Such means can include, for example, a removable storage unit 1520 and an interface 1522.

Various embodiments of the disclosure may take the form of an entirely or partially hardware embodiment, an entirely or partially software embodiment, or a combination of software and hardware (e.g., a firmware embodiment). Further, as described herein, various embodiments of the disclosure (e.g., systems and methods) may take the form of a computer program product including a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can be embodied in, or can include, ROM; RAM; magnetic disk storage media; optical storage media; flash memory, etc.

Unless otherwise expressly stated, it is in no way intended that any protocol, procedure, process, or technique put forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "environment," "system," "module," "component," "architecture," "interface," "unit," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in, or can include, an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in, or can include, an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

As is utilized in this disclosure, the term "processor" can refer to any type of processing circuitry or device. A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed or otherwise configured (e.g., manufactured) to perform the functions described herein.

In some embodiments, processors can utilize nanoscale architectures, in order to optimize space usage or enhance the performance of systems, devices, or other electronic equipment in accordance with this disclosure. For instance, a processor can include molecular transistors and/or quantum-dot based transistors, switches, and gates, Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic disk storage or other magnetic storage devices, flash memory cards or other types of memory cards, cartridges, or any other non-transitory media suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

As used herein, the term device can refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for estimating a velocity of a vehicle, comprising:
    detecting, at a sensor system, a first group of detection points relative to the vehicle at a first instant during movement of the vehicle;
    detecting, at the sensor system, a second group of detection points relative to the vehicle at a second instant during the movement of the vehicle:
    receiving, at a processor, first data indicative of first locations of the first group of detection points and second data indicative of second locations of the second group of detection points;
    transforming, via the processor, the first data into third data corresponding to the second instant, the third data comprising first datasets, each of the first datasets being obtained by transforming the first data using one of a plurality of velocity vectors for the vehicle;
    generating, via the processor, second datasets corresponding to respective unions of the second data with the first datasets;
    generating, via the processor, convex hulls for each of the respective unions;
    determining, via the processor, geometric volumes for each of the convex hulls;
    solving, via the processor, an optimization problem to determine a convex hull having a minimum geometric volume;
    selecting, via the processor, a velocity vector from the plurality of velocity vectors corresponding to the minimum geometric volume as an estimate of the velocity of the vehicle; and
    adjusting, via a control system, an operation of the vehicle based on the estimate of the velocity of the vehicle.

2. The method of claim 1, wherein selecting the estimate of the velocity of the object comprises selecting a first velocity vector associated with the first convex hull as an estimate of a linear velocity vector of the object.

3. The method of claim 1, wherein the transforming comprises:
    propagating, for a time interval corresponding to a difference between the first defined instant and the second defined instant, a position vector along a linear trajectory based on a second velocity vector of the group of defined velocity vectors, and wherein the position vector represents a location of the first locations;
    generating a record indicative of a second location corresponding to the propagated position vector; and
    adding the record to a dataset of the first datasets, the dataset is associated with the second velocity vector.

4. The method of claim 1, wherein the transforming comprises paring the first data by removing at least one outlier record indicative of a location external to the object.

5. The method of claim 1, wherein the plurality of velocity vectors comprises a current velocity vector hypothesis, and wherein determining the minimum geometric volume comprises iteratively updating the current velocity vector hypothesis to progressively reduce a current geometric volume of a current convex hull until a convergence criterion is satisfied.

6. A system for operation of a vehicle, comprising:
    a sensor system configured to detect a first group of detection points relative to the vehicle at a first instant during movement of the vehicle and a second group of detection points relative to the vehicle at a second instant during the movement of the vehicle:
    at least one processor;
    at least one memory device coupled to the at least one processor, the at least one memory device having instructions encoded thereon that, in response to execution, cause the at least on processor to perform or facilitate operations comprising:
        receiving first data indicative of first locations of the first group of detection points;
        receiving second data indicative of second locations of the second group of detection points;
        transforming the first data into third data corresponding to the second instant the third data comprising first dataset, each of the first datasets being obtained by transforming the first data using one of a plurality of velocity vector for the vehicle;
        generating second datasets corresponding to respective unions of the second data with the first datasets;
        generating convex hulls for each of the respective unions;
        determining geometric volumes for each of the convex hulls;
        solving an optimization problem to determine a convex hull having a minimum geometric volume;
        selecting a velocity vector from the plurality of velocity vectors corresponding to the minimum geometric volume as an estimate of the velocity of the vehicle; and
        adjusting an operation of the vehicle based on the estimate of the velocity of the vehicle.

7. The system of claim 6, wherein selecting the estimate of the velocity of the object comprises selecting a first velocity vector associated with the first convex hull as an estimate of a linear velocity vector of the object.

8. The system of claim 6, wherein the transforming comprises:
    propagating, for a time interval corresponding to a difference between the first defined instant and the second defined instant, a position vector along a linear trajectory based on a second velocity vector of the group of defined velocity vectors, and wherein the position vector represents a location of the first locations;

generating a record indicative of a second location corresponding to the propagated position vector; and adding the record to a dataset of the first datasets, the dataset is associated with the second velocity vector.

9. The system of claim 6, wherein the transforming comprises paring the first data by removing at least one outlier record indicative of a location external to the object.

10. The system of claim 6, wherein the plurality of velocity vectors comprises a current velocity vector hypothesis, and wherein determining the minimum geometric volume comprises iteratively updating the current velocity vector hypothesis to progressively reduce a current geometric volume of a current convex hull until a convergence criterion is satisfied.

11. A vehicle, comprising:
a sensor system configured to detect a first group of detection points relative to the vehicle at a first instant during movement of the vehicle and a second group of detection points relative to the vehicle at a second instant during the movement of the vehicle:
a computing system functionally coupled to the sensor system, the computing system including at least one processor configured at least to:
receive first data indicative of first locations of the first group of detection points;
receive second data indicative of second locations of the second group of detection points;
transform the first data into third data corresponding to the second instant, the third data comprising first dataset, each of the first datasets being obtained by transforming the first data using one of a plurality of velocity vector for the vehicle;
generate second datasets corresponding to respective unions of the second data with the first datasets;
generate convex hulls for each of the respective unions;
determine geometric volumes for each of the convex hulls;
solve an optimization problem to determine a convex hull having a minimum geometric volume; and
select a velocity vector from the plurality of velocity vectors corresponding to the minimum geometric volume as an estimate of the velocity of the vehicle; and
a controller system configured to adjust an operation of the vehicle based on the estimate of the velocity of the vehicle.

12. The vehicle of claim 11, wherein the at least one processor is further configured to select the estimate of the velocity of the vehicle by selecting a first velocity vector associated with the first convex hull as an estimate of a linear velocity vector of the vehicle.

13. The vehicle of claim 11, wherein the at least one processor is further configured to transform the first data into third data by:
propagating, for a time interval corresponding to a difference between the first defined instant and the second defined instant, a position vector along a linear trajectory based on a second velocity vector of the group of defined velocity vectors, and wherein the position vector represents a location of the first locations;
generating a record indicative of a second location corresponding to the propagated position vector; and
adding the record to a dataset of the first datasets, the dataset is associated with the second velocity vector.

14. The vehicle of claim 11, wherein the at least one processor is further configured to pare the first data by removing at least one outlier record indicative of a location external to the object.

15. The vehicle of claim 11, wherein the sensor system comprises at least one second processor configured to generate a portion of the first data and a portion of the second data, and wherein the sensor system includes one or more of a radar system or a lidar system.

* * * * *